(12) United States Patent
Elter et al.

(10) Patent No.: US 8,600,141 B2
(45) Date of Patent: Dec. 3, 2013

(54) METHOD AND DEVICE FOR THE SEGMENTATION OF A LESION

(75) Inventors: Matthias Elter, Erlangen (DE); Tobias Bergen, Erlangen (DE)

(73) Assignee: Fraunhofer-Gesellschaft zur Föderung der angewandten Forschung e.V., München (DE)

( * ) Notice: Subject to any disclaimer, the term of this patent is extended or adjusted under 35 U.S.C. 154(b) by 528 days.

(21) Appl. No.: 12/935,684

(22) PCT Filed: Mar. 26, 2009

(86) PCT No.: PCT/EP2009/002198
§ 371 (c)(1),
(2), (4) Date: Sep. 30, 2010

(87) PCT Pub. No.: WO2009/121510
PCT Pub. Date: Oct. 8, 2009

(65) Prior Publication Data
US 2011/0026788 A1 Feb. 3, 2011

(30) Foreign Application Priority Data
Apr. 2, 2008 (DE) .......... 10 2008 016 807

(51) Int. Cl.
*G06K 9/36* (2006.01)
(52) U.S. Cl.
USPC .......... 382/132; 382/173
(58) Field of Classification Search
None
See application file for complete search history.

(56) References Cited

U.S. PATENT DOCUMENTS

| | | | | |
|---|---|---|---|---|
| 5,832,103 A | * | 11/1998 | Giger et al. | 382/130 |
| 2008/0008369 A1 | * | 1/2008 | Koptenko et al. | 382/128 |
| 2008/0260229 A1 | * | 10/2008 | Mashiach | 382/131 |

FOREIGN PATENT DOCUMENTS

WO WO 2007/119 204 A 10/2007

OTHER PUBLICATIONS

J. A. Sethian, "Level Set Methods and Fast Marching Methods", Cambridge University Press, New York, Jun. 1999.
J. Matas et al., "Robust Wide Baseline Stereo from Maximally Stable Extremal Regions" Proceedings of the British Machine Vision Conference, vol. 1, pp. 384 to 393, London, 2002.
J Kittler and J. Illingworth, "On Threshold Selection Using Clustering Criteria" IEEE Transactions System, Man and Cybernetics, 1985, 15(5), 652-654.
J Kittler and J. Illingworth, "Minimum Error Thresholding" Pattern Recognition, vol. 19, No. 1, pp. 41-47, 1986.
N. Otsu, "A Threshold Selection Method from Grey Level Histograms" IEEE Transactions System, Man and Cybernetics, 1979, 9, 62-66.
J. N. Kapur et al., "A New Method for Grey Level Picture Thresholding Using the Entropy of Histogram" Computervision, Graphics and Image Processing, 1985, 29(3), 273-285.

(Continued)

*Primary Examiner* — Brian P Werner
(74) *Attorney, Agent, or Firm* — McGlew and Tuttle, P.C.

(57) ABSTRACT

In a method and a device for the segmentation of a lesion, a quantity of candidate regions for the lesion is determined proceeding from a starting region by means of a candidate unit. The candidate regions are arranged substantially concentrically to the starting region. A candidate region closest to the lesion is selected automatically by means of a selection unit or manually by means of a correction unit from the quantity of candidate regions. The selected candidate region is a reliable and robust basis for a classification of the lesion.

20 Claims, 7 Drawing Sheets

(56) References Cited

OTHER PUBLICATIONS

Andy Tsai et al., "A Shape-Based Approach to the Segmentation of Medical Imagery Using Level Sets", IEEE Transactions on Medical Imaging, IEEE Service Center, Piscataway, NJ, US, Bd. 22, Nr. 2, Feb. 1, 2003, XP011076429 ISSN: 0278-0062, pp. 137-154.

* cited by examiner 23  4  3  $A_W$  6

4  3  7  $A_W$  6  $K_W$

METHOD AND DEVICE FOR THE SEGMENTATION OF A LESION

CROSS REFERENCE TO RELATED APPLICATIONS

This application is a United States National Phase application of International Application PCT/EP2009/002198 and claims the benefit of priority under 35 U.S.C. §119 of German Patent Application DE 10 2008 016 807.6 filed Apr. 2, 2008, the entire contents of which are incorporated herein by reference.

FIELD OF THE INVENTION

The invention relates to a method and a device for the segmentation of a lesion.

BACKGROUND OF THE INVENTION

Breast cancer is the most frequent cancer disease in women in the western world. Early recognition of this disease improves the survival chances of the women affected. Digital X-ray mammography is the most effective technique for recognizing breast cancer tumors in early stages. An important group of breast lesions, which are to be found in digital mammography images are the so-called focal findings. Focal findings are local compressions, which are visible in at least two x-ray projections and are generally characterized on the basis of their size, shape and type of outer contour. While focal findings with a speculated, blurred or a microlobulated outer contour are malignant tumors with a high degree of probability, round or oval focal findings with a precise outer contour are generally benign tumors, such as, for example, fibroadenomas, lymph nodes or cysts.

Distinguishing between benign and malignant focal findings using their appearance in a mammography image is difficult in practice as a mammography image is a two-dimensional transmitted-light recording of the three-dimensional breast, whereby optical superimpositions with breast tissue take place in the mammography image. Optical superimpositions of benign focal findings with breast tissue are often difficult to distinguish from malignant focal findings in mammography images. Thus, benign tumors can adopt optical characteristics of malignant tumors and vice versa owing to optical superimpositions.

The radiologist decides on the basis of mammography images about the further medical course of action. If a lesion is possibly a malignant tumor, this is checked by a so-called breast biopsy. If, on the other hand, the lesion has a high probability of being a benign tumor, a control investigation is generally carried out at an interval of a few months. As a breast biopsy is connected with considerable stress for the patient affected, and moreover gives rise to considerable costs, a reliable distinction between benign and malignant tumors is aimed for in order to reduce the number of unnecessary breast biopsies.

To reduce unnecessary breast biopsies, assistance systems are used, which provide a decision aid and are therefore intended to make a reliable distinction between benign and malignant lesions possible. In assistance systems of this type, an important step for setting up the decision aid is the separation of the lesion, for example the focal finding, from the image background of the mammography image. This separation is called segmentation or segmenting. Segmentation forms the basis for the determination of features which describe the shape and the outer contour of the lesion. Known methods for segmentation in principle allow the separation of the lesion from the image background, but the separation is often too imprecise because of optical superimpositions, low contrast or high image noise, so no reliable decision aid can be provided by the assistance system.

A method for the segmentation of a lesion is known from WO 2007/119 204 A2, in which, proceeding from a local intensity maximum in the mammography image, a region is selected, in which the lesion is located. In this region, the image pixels are compared with a threshold value and thus allocated to the lesion or the image background. The image obtained in this manner is reprocessed by means of a so-called internal or external region growth method. The result is the segmented lesion. This process is repeated for all of the relevant local intensity maxima in the mammography image, so all the lesions are detected. The segmentation result is used as the basis for the following step of feature extraction, the latter being carried out both on the segmented lesions and also on sub-regions thereof. Optical superimpositions, a low contrast or high image noise also impair the result of the segmentation in this method.

SUMMARY OF THE INVENTION

The invention is therefore based on the object of providing a reliable and robust method for the segmentation of lesions.

This object is achieved according to the invention by a method for the segmentation of a lesion, comprising the steps:
providing an image region selected from a digital image with a recorded lesion,
determining a starting region for the lesion in the image region, wherein the starting region has a starting region outer contour,
determining a quantity of candidate regions for the lesion in such a way that
each candidate region has a candidate region outer contour including the starting region outer contour,
two respective adjacent candidate regions form an inner candidate region and an outer candidate region with respect to one another, and
the candidate region outer contour of each outer candidate region includes the candidate region outer contour of the associated inner candidate region, and
selecting a candidate region closest to the lesion from the quantity of candidate regions.

According to the invention, it was recognized that the reliability and robustness of the segmentation can be improved if, proceeding from a starting region, a quantity of candidate regions for the lesion is determined. The candidate regions are arranged substantially concentrically to the starting region. The candidate regions have associated candidate region outer contours, which do not intersect one another nor do they intersect the starting region outer contour. Adjacent candidate regions therefore in each case form an inner candidate region and an outer candidate region with respect to one another, the candidate region outer contour of each outer candidate region including the candidate region outer contour of the associated inner candidate region. Furthermore, the candidate region outer contour of each candidate region includes the starting region outer contour. As lesions, in particular in focal findings, are compressed breast tissue and the density decreases outwardly proceeding from a center of the compressed breast tissue, when determining the candidate regions, a typical property of mammogram lesions, in particular of focal findings, is utilized. The determination of a plurality of candidate regions therefore supplies a plurality of possible outer contours corresponding to the candidate region outer contours for the lesion. From the quantity of candidate regions, one most probable candidate region can be selected in a targeted manner, the candidate region outer contour of which comes closest to the outer contour of the lesion. Since a plurality of candidate regions can be selected, more information is available which allows a more targeted selection of the closest candidate region. Moreover, owing to the quantity of candidate regions, an interaction possibility is provided, by means of which an incorrect automatic selection of the closest candidate region can be corrected by a manual selection. The method according to the invention therefore allows a reliable and robust separation of lesions, in particular focal findings, from the image background of the recorded image. A reliable basis is thus provided for the subsequent setting up of a decision aid in an assistance system.

To set up a decision aid, relevant features of the selected candidate region are extracted. For example, shape features of the candidate region outer contour, texture features and/or features of the lesion describing the tissue density may be determined. The feature extraction preferably takes place exclusively using the selected candidate region, in other words that closest to the lesion. After the feature extraction, the lesion is classified, it being possible to use all the features or a sub-quantity of the extracted features for this purpose. This classification may, for example, take place into the classes "benign" or "malignant".

In contrast to WO 2007/119 204 A2, in the segmentation method according to the invention, a plurality of candidate regions for the lesion are determined proceeding from a starting region. From these candidate regions, the candidate region closest to the lesion is selected. This is the result of the segmentation method. In the segmentation method according to WO 2007/119 204 A2, only one region is determined. In the subsequent feature extraction, further sub-regions are determined and evaluated proceeding from this segmentation result.

A preparation of the image region before the determination of the starting region by low-pass filtering of associated digital image data simplifies the determination of the starting region, as the image region is smoothed by the low-pass filtering. A Gaussian value or mean value filter can be used as the low-pass filter. An edge-receiving low-pass filter, such as, for example, an anisotropic diffusion filter, a local-adaptive low-pass filter or a Kuwahara filter is preferably used.

A preparation of the image region by a quantization step reduction of associated digital image data before the determination of the starting region simplifies the determination of the starting region. The quantization step reduction preferably takes place after the low-pass filtering. The desired reduced number of quantization steps may either be rigidly predetermined or adaptively attached to the image content of the image region.

A starting region being a connected region of pixels of one quantization step is easy to determine.

A starting region exceeding a predefined minimum size allows a reliable selection of a suitable starting region if a plurality of starting regions are available for selection.

A development in which a spacing of the starting region from a center point of the image region falls below a predefined maximum spacing excludes the selection of an unsuitable starting region if a plurality of starting regions are available for selection.

A starting region having the brightest quantization step with high probability corresponds to the center of the compressed breast tissue and is therefore particularly suitable.

It is easy to carry out a determination of the candidate regions being connected regions of pixels of one respective quantization step.

A determination of the candidate regions, proceeding from the starting region, having monotonically decreasing quantization steps utilizes the property that the density of the compressed breast tissue outwardly decreases proceeding from the center. The candidate regions therefore provide probable outer contours for the lesion.

A barrier being predefined by a user interface and limiting at least one of the candidate regions provides an additional boundary condition when determining the candidate regions, so nonsensical candidate regions are excluded. The barrier is predetermined by a user interface. The user interface provides an interaction possibility when determining the candidate regions. A barrier is preferably only predetermined when the method determines at least one nonsensical candidate region without the specification.

A level set method determining the candidate regions allows a reliable determination of suitable candidate regions. In the level set method, a three dimensional aid function is defined from image information of the selected image region. The aid function, to determine a candidate region, is intersected by a plane, the quantity of intersection points being the candidate region outer contour. To determine a plurality of candidate regions, the three-dimensional aid function is intersected by the plane at different heights. The level set method is described in detail in the book by J. A. Sethian "Level Set Methods and Fast Marching Methods" (Cambridge University Press, New York, June 1999). Reference is expressly made to this book. A suitable quantity of candidate regions is preferably selected from the large number of candidate regions, which are produced by the intersection at different heights. The selection takes place by the method of maximally stable regions. In order to determine the maximally stable candidate regions, to each instant within the level set method, the size of the current region at this instant is allocated, which produces a size function. Whenever the first derivation of this size function has a local minimum, the associated region is considered maximally stable and is allocated to the quantity of candidate regions. A smoothing of the size function before the determination of local minima increases the robustness. The method of maximally stable regions is described in detail in the article by J. Mathas et al. "Robust Wide Baseline Stereo from Maximally Stable Extremal Regions" (Proceedings of the British Machine Vision Conference, Volume 1, pages 384 to 393, London, 2002). Reference is expressly made to this article.

A speed function being defined by using image information from the image region and properties of the starting region outer contour, which describes a speed with which the points of the starting region outer contour move orthogonally with respect thereto, provides a suitable basis for determining the candidate regions.

A size function being produced by allocating to each instant within the level set method a size of a current region at this instant, in which a region being allocated to the quantity of candidate regions if a first derivation of the size function has a local minimum allows a reliable selection of suitable candidate regions from the large number of regions which the level set method provides. Since a region is only allocated to the quantity of candidate regions if the first derivation of the size function has a local minimum, only maximally stable regions become candidate regions.

A selection of the candidate region closest to the lesion taking place by means of at least one predefined selection criterion allows, in a simple manner, the automated provision of the closest candidate region. The local gradient on the respective candidate region outer contour, in other words at the transition from a candidate region to the respective image background, may be used, for example, as the selection criterion. Criteria can furthermore be used as selection criteria, which are used in known methods for optimal threshold value determination. The criteria for threshold value determination are based on the distribution of the quantization steps (=histogram) inside and outside the selected image region. On the basis of this distribution, for example, the inter-class variance is maximized, the Bayes error minimized or an entropy measure maximized. In relation to methods for optimal threshold value determination, reference is made to the articles by J. Kittler and J. Illingworth "On Threshold Selection Using Clustering Criteria" (IEEE Transactions System, Man and Cybernetics, 1985, 15(5), 652-654) and "Minimum Error Thresholding" (Pattern Recognition, Vol. 19, No. 1, pages 41-47, 1986) as well as the articles by N. Otsu "A Threshold Selection Method from Grey Level Histograms" (IEEE Transactions System, Man and Cybernetics, 1979, 9, 62-66) and J. N. Kapur et al. "A New Method for Grey Level Picture Thresholding Using the Entropy of Histogram" (Computer-vision, Graphics and Image Processing, 1985, 29(3), 273-285).

A selection of the candidate region closest to the lesion taking place by means of a user interface allows a manual selection of the closest candidate region. The user interface provides an interaction possibility for this. The manual selection to correct an incorrectly automatically selected candidate region is preferably carried out.

The invention is also based on the object of providing a device for the segmentation of a lesion, which allows a reliable and robust segmentation.

This object is achieved according to the invention by a device for the segmentation of a lesion with
  an input for providing an image region selected from a digital image with a recorded lesion,
  an initialization unit for determining a starting region for the lesion in the image region, the starting region having a starting region outer contour,
  a candidate unit for determining a quantity of candidate regions for the lesion, wherein the candidate regions are determinable in such a way that
    each candidate region has a candidate region outer contour including the starting region outer contour,
    two respective adjacent candidate regions form an inner candidate region and an outer candidate region with respect to one another, and
    the candidate region outer contour of each outer candidate region includes the candidate region outer contour of the associated inner candidate region, and
  a selection unit for selecting a candidate region closest to the lesion from the quantity of candidate regions.

The advantages of the device according to the invention correspond to the advantages of the method according to the invention.

A correction unit being connected to a user interface and being provided to select the candidate region closest to the lesion allows an interaction of the user when selecting the closest candidate region.

A barrier unit being connected to a user interface and being provided to define barriers for the candidate regions allows the definition of barriers, which are to be taken into account as additional boundary conditions when determining the candidate regions. The determination of nonsensical candidate regions because of optical superimpositions or a poor image quality is therefore avoided.

A preparation unit being provided to prepare the image region simplifies the determination of the starting region and the candidate regions.

An assistance system for setting up a decision aid to distinguish between benign and malignant lesions, in particular of focal findings, with a device according to the invention provides a reliable decision aid.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
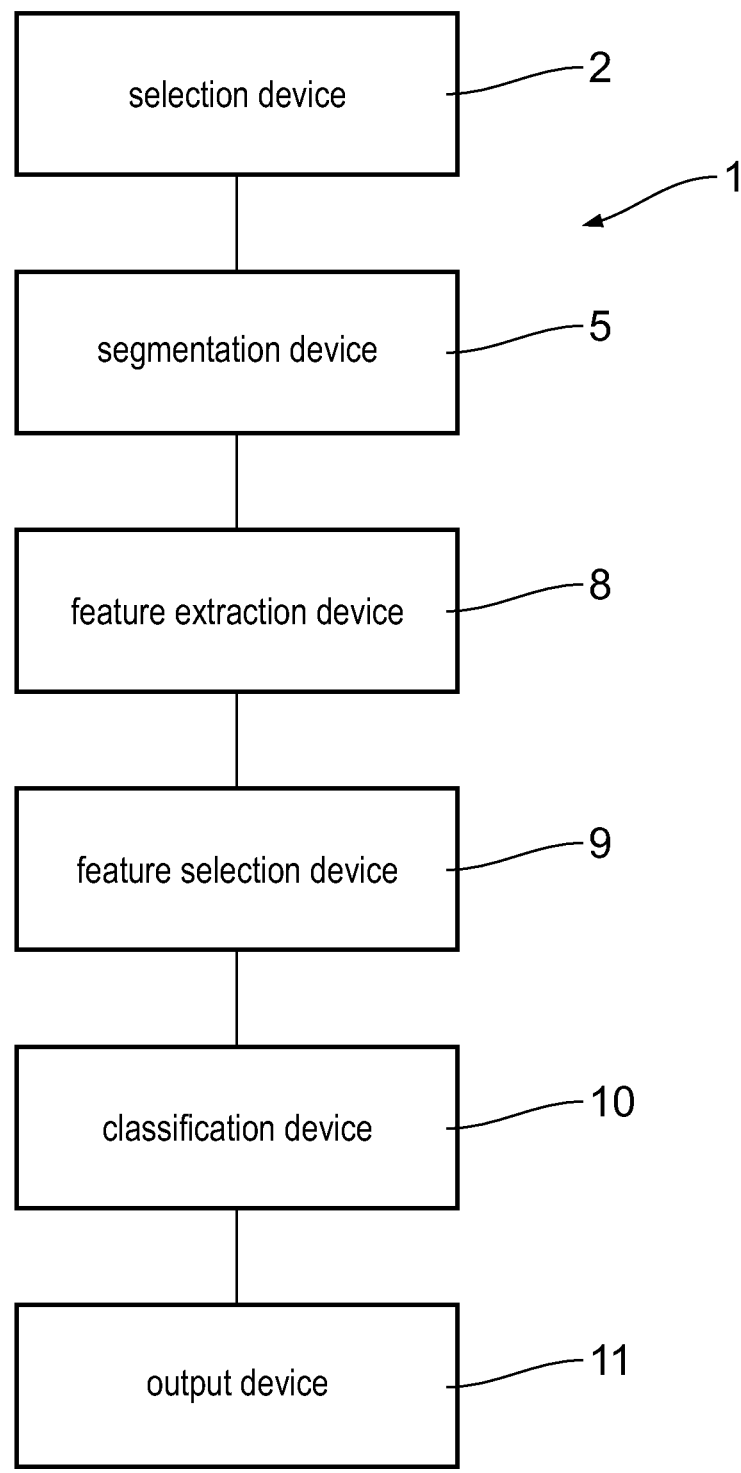
FIG. 1 is a schematic view of an assistance system with a device for the segmentation of a lesion according to a first embodiment.
Figure 2:
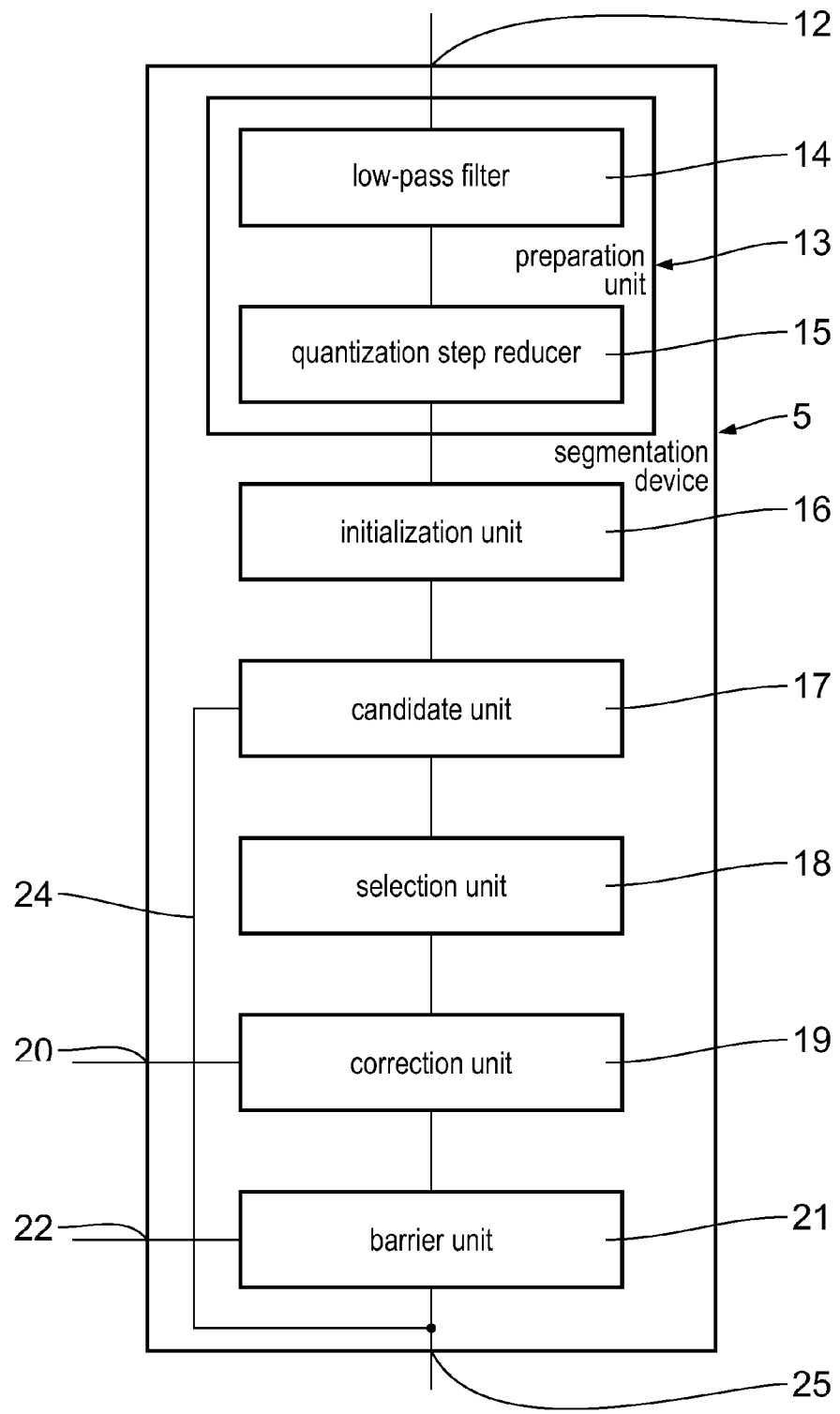
FIG. 2 is a schematic view of the device in FIG. 1.

A first embodiment of the invention will be described below with reference to FIG. 1 to 10. An assistance system 1 is used to set up a decision aid to distinguish between a benign breast lesion and a malignant breast lesion.

The assistance system 1 has a selection device 2. The selection device 2 is used to select an image region 3 of interest, which contains a lesion 4 in the form of a focal finding. The lesion will be designated below a focal finding 4. A device 5 for the segmentation of the focal finding 4 is arranged downstream of the selection device 2. The device will be designated a segmentation device 5 below. The segmentation device 5 is used to separate the focal finding 4 from an image background 6 of the image region 3. The segmentation device 5 supplies, as the result of the segmentation, a segmented focal finding 7, which ideally corresponds to the actual focal finding 4.

Arranged downstream of the segmentation device 5 is a feature extraction device 8. This is used to extract features to characterize the focal finding 4.

Arranged downstream of the feature extraction device 8 is a feature selection device 9. This is used to determine an optimal sub-quantity of features for a reliable classification of the focal finding 4.

Arranged downstream of the feature selection device 9 is a classification device 10. The classification device 10 is used to classify the focal finding 4 using the optimal sub-quantity of features. The classification device 10 supplies, as the result, a classification of the focal finding 4 into the classes "benign" or "malignant". The classification result is provided by means of a downstream output device 11 to a user in the form of a decision aid.

The segmentation device 5 has an input 12, which is connected to a preparation unit 13. The preparation unit 13 is used to prepare the image region 3 and comprises a low-pass filter 14 and a quantization step reducer 15. The low-pass filter 14 is used to smooth quantization steps Q, which the pixilated image region 3 has in the individual pixels. The quantization step reducer 15 is arranged downstream of the low-pass filter 14. The number of quantization steps Q in the image region 3 can be reduced by means of the quantization step reducer 15.

An initialization unit 16 is arranged downstream of the preparation unit 13. The initialization unit 16 is used to determine a starting region with an associated starting region outer contour $A_S$ for the focal finding 4.

A candidate unit 17 is arranged downstream of the initialization unit 16. The candidate unit 17 is used to determine a quantity of candidate regions with associated candidate region outer contours $A_K$ for the focal finding 4. The individual candidate regions K will be designated K(i) below, wherein i=1 to n. The candidate regions K can be determined by means of the candidate unit 17 in such a way that the candidate region outer contours $A_K$ of the candidate regions K include the starting region outer contour $A_S$ and the candidate region outer contour $A_K$(i) of each outer candidate region K(i) includes the outer region outer contour $A_K$(i−1) of the associated inner candidate region K(i−1).

A selection unit 18 is arranged downstream of the candidate unit 17. The selection unit 18 is used to select a candidate region $K_W$ closest to the focal finding 4 from the quantity of candidate regions K, which with high probability corresponds to the focal finding 4.

A correction unit 19 is arranged downstream of the selection unit 18. The correction unit 19 is connected to a first user interface 20. The correction unit 19 is used for the manual selection of the candidate region $K_W$ closest to the focal finding 4 if the candidate region $K_W$ selected by the selection unit 18 was selected incorrectly.

A barrier unit 21 is arranged downstream of the correction unit 19. The barrier unit 21 is connected to a second user interface 22. The barrier unit 21 is used for the manual definition of barriers 23 for the candidate regions K if, for example, the candidate region outer contour $A_K$ of one of the candidate regions K is not enclosed within the image region 3. The barrier unit 21 is connected to the candidate unit 17 by an internal signal connection 24 so, after the definition of barriers 23, a redetermination of the candidate regions K can be initiated. The barrier unit 21 is also connected to an output 25 of the segmentation device 5. At the output 25, the segmentation device 5 provides the candidate region $K_W$ closest to the focal finding 4 and the associated candidate region outer contour $A_{KW}$.

A digital mammography image of the breast is supplied to the selection device 2. The image region 3, which contains the recorded focal finding 4 of interest, is selected by means of the selection device 2 from the digital image. The selected image region 3 is designated the "Region of Interest" (ROI) and is rectangular.

Figure 3:
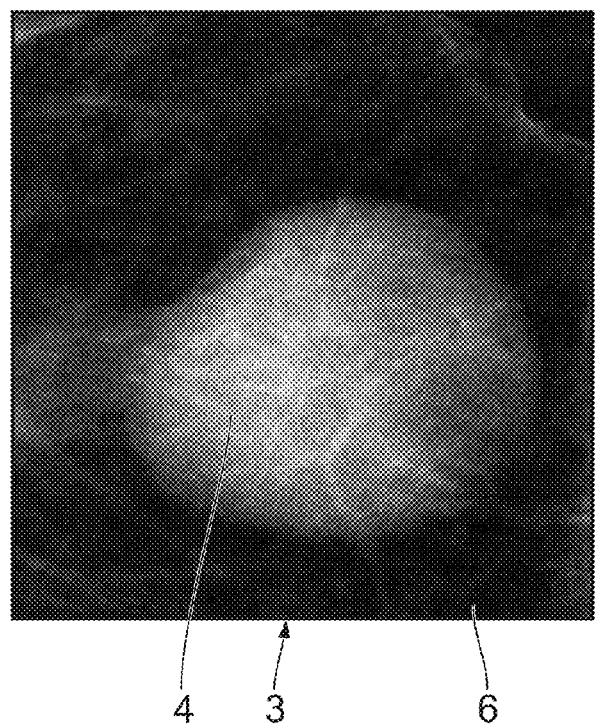
FIG. 3 is a view of an image region of a mammography image with a recorded lesion.

The selected image region 3 is supplied to the segmentation device 5. The selected image region 3 with the recorded focal finding 4 and the associated image background 6 is shown in FIG. 3.

Figure 4:
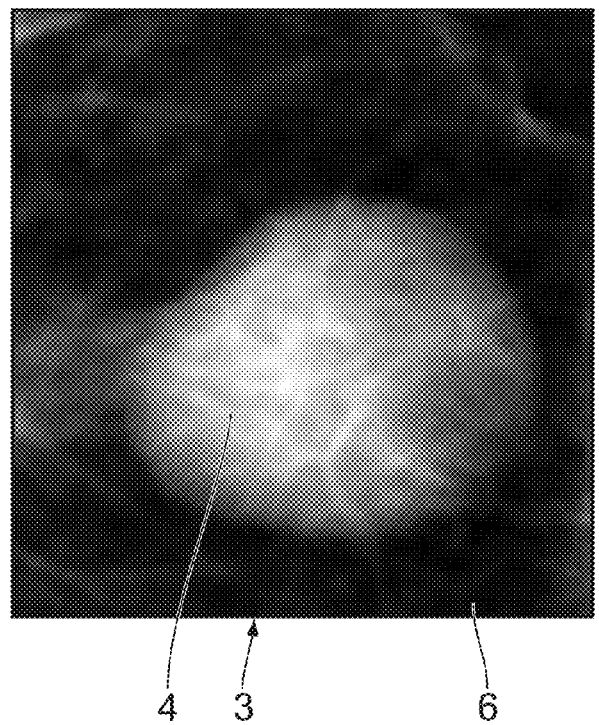
FIG. 4 is a view of the image region according to FIG. 3 after a low-pass filtering.

The digital image data associated with the image region 3 are prepared in the preparation unit 13 by means of the low-pass filter 14. The quantization steps Q in the pixels of the image region 3 are smoothed by the low-pas filtering. The low-pass filter 14 is configured as an edge-receiving low-pass filter, such as, for example, as an anisotropic diffusion filter, as a local-adaptive low-pass filter or as a Kuwahara filter. The low-pass filtered image region 3 is shown in FIG. 4.

Figure 5:
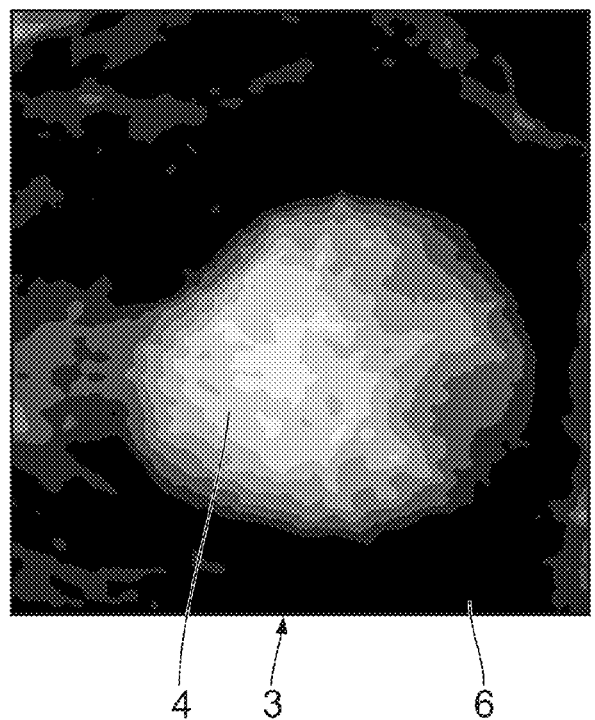
FIG. 5 is a view of the image region according to FIG. 4 after a quantization step reduction.

The low-pass filtered image region 3 is then subjected to a quantization step reduction by means of the quantization step reducer 15. The digital image data associated with the low-pass filtered image region 3, before the quantization step reduction, have a first number N1 of quantization steps. This is, for example, 4096 (12 bit). By means of the quantization step reducer 15, the first number N1 is reduced to a second number N2 of quantization steps Q. The second number N2 is, for example, 255. The second number N2 may be selected to be constant or adapted to the image region 3. FIG. 5 shows the image region 3 after the quantization step reduction.

The prepared image region 3 is supplied to determine the starting region S of the initialization unit 16. The determination of the starting region S takes place in the initialization unit 16 using the following criteria:

The starting region S has to be a connected region of pixels of the same quantization step Q.

The starting region S must exceed a predefined minimum size in terms of area. The minimum size may, for example, be 10% of the selected image region 3.

The spacing of the starting region S from a center point M of the selected image region 3 must fall below a predefined maximum spacing. The maximum spacing may, for example, be 25% of the side length of the selected image region 3. Thus, the spacing between the center point M and the starting region outer contour $A_S$ must, for example, be less than 25% of the side length of the selected image region 3.

The starting region S has the brightest quantization step Q.

Figure 6:
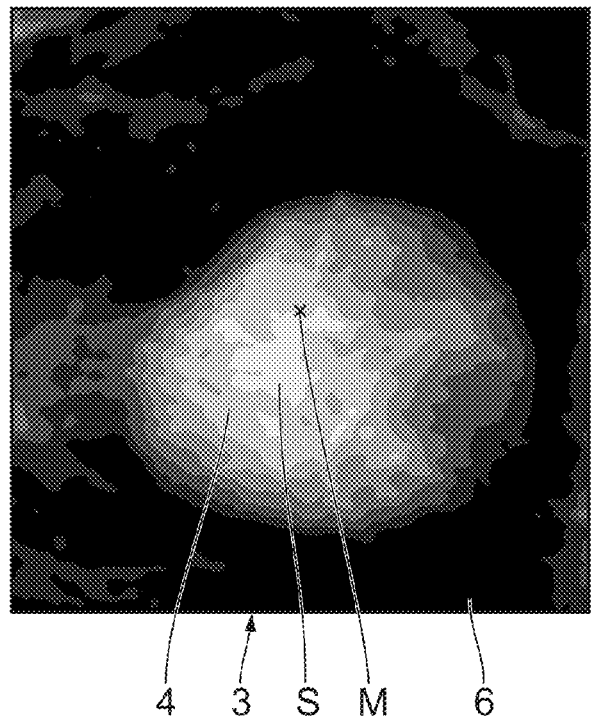
FIG. 6 is a view of the image region according to FIG. 5 with a starting region.

The starting region S determined in this manner with the associated starting region outer contour $A_S$ is the starting point for the following determination of the candidate regions K in the candidate unit 17. The determined starting region S is shown in FIG. 6.

The candidate unit 17 determines the candidate regions K according to the following criteria:

The candidate regions K are arranged substantially concentrically to the starting region S. This means that the candidate region outer contour $A_K$ of each candidate region K includes the starting region outer contour $A_S$ and the candidate region outer contour $A_K$(i) of each outer candidate region K(i) includes the candidate region outer contour $A_K$(i−1) of each associated inner candidate region K(i−1). Thus, the candidate region outer contour $A_K$ of each candidate region K does not intersect the further candidate region outer contours $A_K$ and the starting region outer contour $A_S$.

The candidate regions K are connected regions of pixels of one respective quantization step Q.

The candidate regions K, proceeding from the starting region S, have monotonically decreasing quantization steps Q. This means that the candidate region K(i−1) has a brighter quantization step Q than the candidate region K(i).

Figure 7:
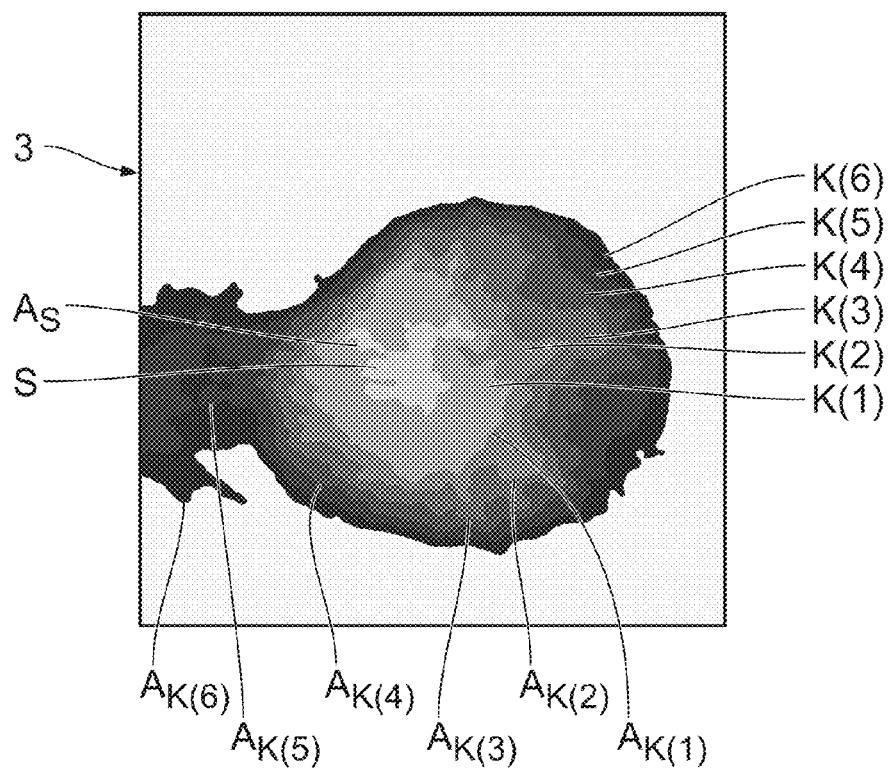
FIG. 7 is a view of the image region according to FIG. 6 with a quantity of candidate regions.
Figure 8:
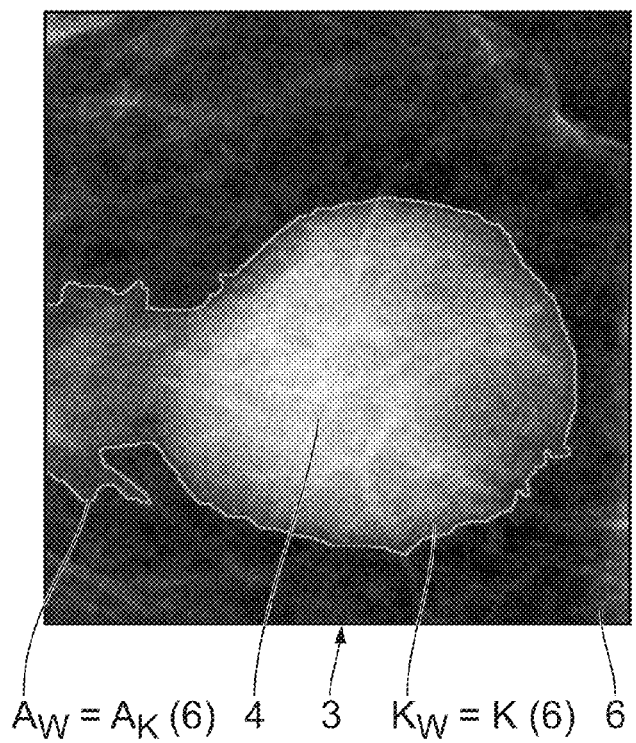
FIG. 8 is a view of the image region according to FIG. 7 with a selected and appearing candidate region breaking out.

As the focal findings 4 are compressed breast tissue, the density of which outwardly decreases proceeding from a center, the candidate unit 17, when determining the candidate regions K, utilizes a typical property of focal findings 4. If, when determining the candidate regions K, smaller regions of a higher or lower quantization step Q are included, these smaller regions are closed by the candidate region K, so the latter is compact. The determination of the candidate regions K may, for example, be realized by means of an iterative threshold value method with a decreasing threshold value or by the step-wise extension of the starting region S by adjacent pixels. FIG. 7, in addition to the starting region S, shows six candidate regions K(1) to K(6) with their associated candidate region outer contours $A_K(1)$ to $A_K(6)$. As can be seen from FIG. 7, the candidate regions K(5) and K(6) break out of the image region 3. This means that the associated candidate region outer contours $A_K(5)$ and $A_K(6)$ are not enclosed within the image region 3.

The quantity of candidate regions K is supplied to the selection unit 18 to select the closest candidate region $K_W$. The selection unit 18, using predefined selection criteria, selects, from the quantity of candidate regions K, the candidate region $K_W$, which is closest to the focal finding 4. The selection takes place automatically. The local gradient at the candidate region outer contours $A_K$ can be used, for example, as the selection criterion. Alternatively, selection criteria may be used, which are generally a component of approaches for optimal threshold value determination. The criteria for threshold value determination are based on the distribution of the quantization steps (=histogram) inside and outside the selected image region. On the basis of this distribution, for example, the interclass variance is maximized or the Bayes error is minimized or an entropy measure is maximized. As can be seen from FIG. 8, the selection unit 18 selects the candidate region K(6) as the candidate region $K_W$ closest to the focal finding 4.

Figure 9:
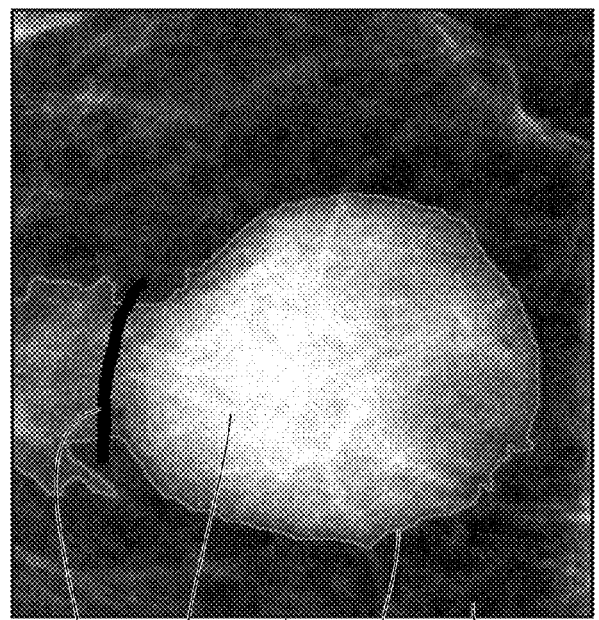
FIG. 9 is a view of the image region according to FIG. 8 with a barrier.

The breaking out candidate region K(6) was not correctly determined on the basis of optical superimpositions in the selected image region 3, so the selected candidate region $K_W$ is unusable. Using the correction unit 19, a user can manually correct the automatic selection of the candidate region $K_W$ via the first user interface 20. Moreover, a user, on recognizing the breaking out candidate region K(6), can define a barrier 23 by means of the barrier unit 21 via the second user interface 22 and again initiate the determination of the candidate regions K. FIG. 9 shows a defined barrier 23, which, in a subsequent redetermination of the candidate regions K, is an additional boundary condition, which prevents the breaking out of candidate regions K(5) and K(6).

Figure 10:
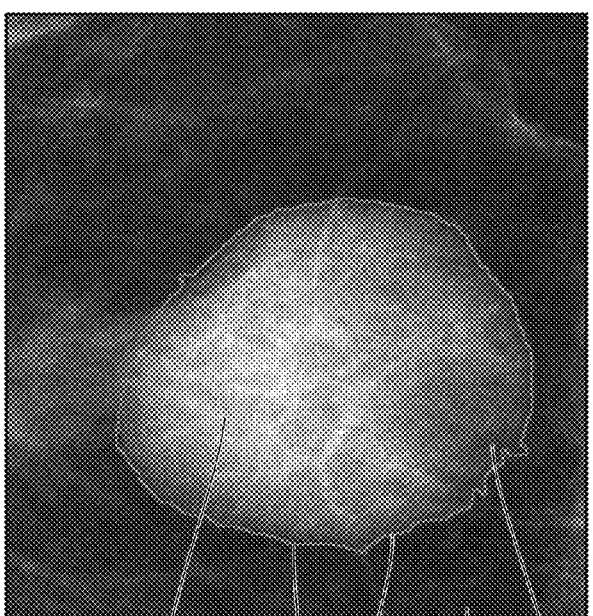
FIG. 10 is a view of the image region according to FIG. 9 with a candidate region closest to the lesion.

The candidate unit 17 is restarted by the barrier unit 21 via the internal signal connection 24 and redetermines the quantity of candidate regions K taking into account the barrier 23. The selection unit 18 then again selects, from the candidate regions K, the candidate region $K_W$ closest to the focal finding 4. This selection can again be corrected by a user by means of the correction unit 19. If the candidate unit 17 and the selection unit 18 already provide, after the first determination of the candidate regions K, a suitable candidate region $K_W$, a correction of the selection and a defining of barriers 23 do not have to take place. FIG. 10 shows the candidate region $K_W$ closest to the focal finding 4 with the associated candidate region outer contour $A_W$ taking into account the defined barrier 23.

The candidate region $K_W$ and the associated candidate region outer contour $A_W$ is then supplied to the feature extraction device 8. On the basis of the candidate region outer contour $A_W$, the latter determines shape features and further features, such as, for example, texture features or features describing the tissue density, of the focal finding 4. The features are then supplied to the feature selection device 9. From the features, the latter determines an optimal sub-quantity of features, which is supplied to the classification device 10. The classification device 10, using the sub-quantity of features, classifies the focal finding 4 into one of the classes "benign" or "malignant". The classification device 10 is configured, for example, as an artificial neural network or as a support vector machine. Alternatively, the classification may take place by means of case-based conclusion. The classification result is supplied to the output device 11, which, from the classification result, sets up a decision aid to differentiate the focal finding 4 into the classes "benign" or "malignant" and to output them.

Figure 11:
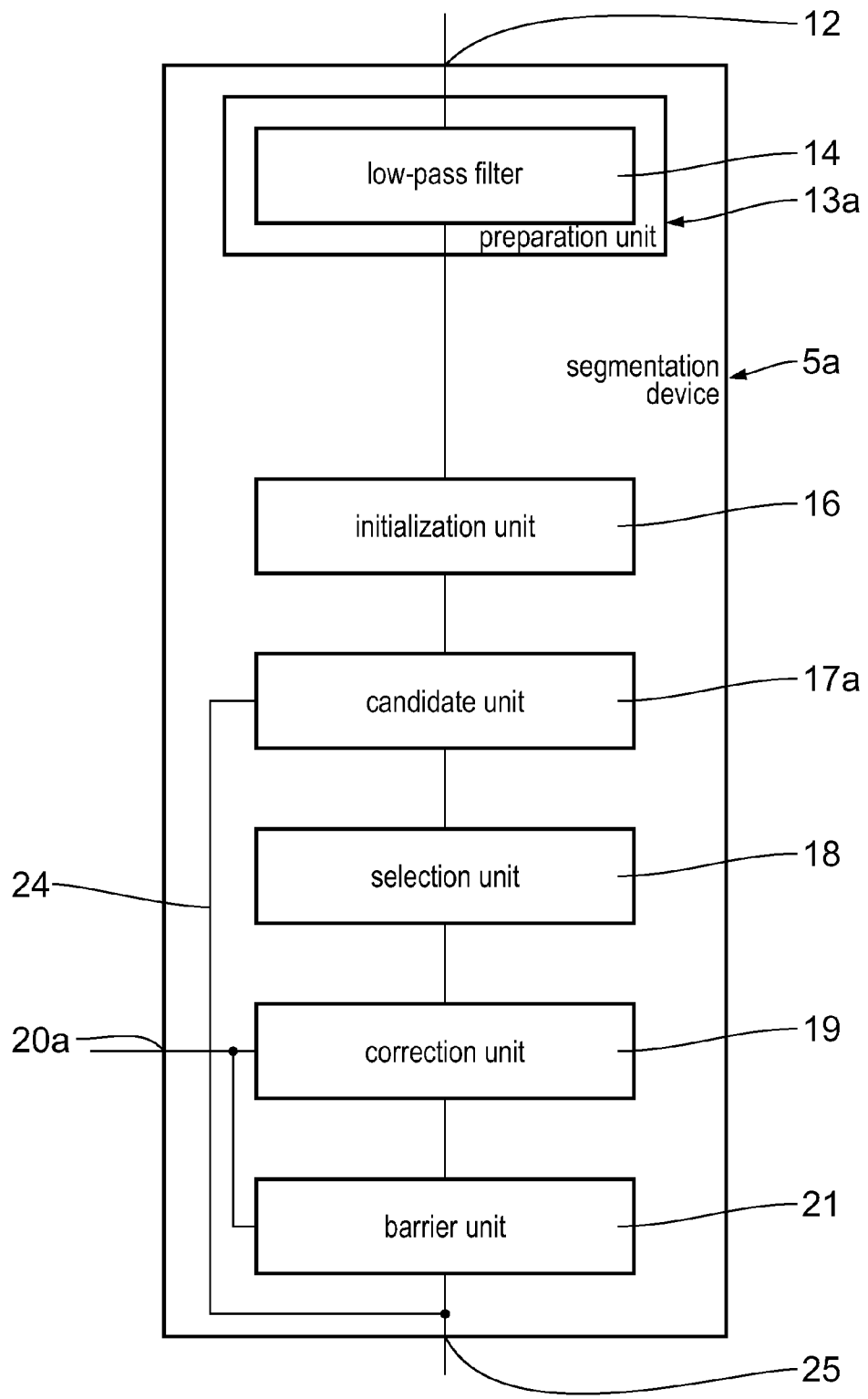
FIG. 11 is a schematic view of a device for the segmentation of a lesion according to a second embodiment.

With reference to FIG. 11, a second embodiment of the invention will be described below. Structurally identical parts receive the same reference numerals as in the first embodiment, to the description of which reference is hereby made. Structurally different, but functionally similar parts receive the same reference numerals with an a placed after them. The important difference compared to the first embodiment is that a level set method is implemented in the candidate unit 17a, by means of which the candidate regions K are determined. A quantization step reducer 15 is not necessary in the preparation unit 13a.

A speed function is defined for the segmentation by means of the level set method in the candidate unit 17a using image information from the image region 3 and properties of the starting region outer contour $A_S$. The speed function is defined in that an energy functional is minimized by means of the Euler Lagrange. For the segmentation of the focal finding 4, the energy functional is selected using the reciprocal value of the sum of the gradient size along the starting region outer contour $A_S$, the sum of the inter class variances of the quantization steps Q in the individual pixels inside and outside the starting region outer contour $A_S$ and the Bayes error, which is produced when the pixels, in accordance with their quantization step Q, are allocated to the classes "inside" and "outside" the starting region outer contour $A_S$. The speed function defines the speed at which the points of the starting region outer contour $A_S$ move outwardly or inwardly orthogonally with respect thereto. If the speed function is positive, the starting region outer contour $A_S$ migrates outwardly with each iteration of the level set method. At each instant, a valid segmentation is therefore present and concentric regions, which are potential candidate regions K, are produced after the closing of holes. A few candidate regions K are selected from the regions thus being produced. The selection of the quantity of candidate regions K takes place on the basis of the method of maximally stable regions. In order to determine the quantity of maximally stable regions, the size of the current region at this instant is allocated to each instant within the level set method. A size function is produced in this manner. Whenever the first derivation of this size function has a local minimum, the corresponding region is considered to be maximally stable and is allocated to the quantity of candidate regions K. A smoothing of the size function increases the robustness in the selection of the candidate regions K.

In the level set method, using the speed function, a three-dimensional aid function is constructed, the quantity of intersection points of the aid function with a plane at the respective heights defining the candidate region outer contours $A_K$. The narrow band algorithm or the fast marching algorithm can be used as the solution algorithm for the level set approach.

The candidate region $K_W$ closest to the focal finding 4 is selected from the candidate regions K in accordance with the first embodiment. The interface 20a is connected to the correction unit 19 and the barrier unit 21, so both a manual selection of the candidate region $K_W$ and also a defining of barriers 23 are possible via the interface 20a.

While specific embodiments of the invention have been described in detail to illustrate the application of the principles of the invention, it will be understood that the invention may be embodied otherwise without departing from such principles.

The invention claimed is:

1. A method for the segmentation of a lesion, comprising the steps:
   providing an image region selected from a digital image with a recorded lesion;
   determining a starting region for the lesion in the image region, wherein the starting region has a starting region outer contour;
   determining a quantity of candidate regions for the lesion in such a way that each candidate region has a candidate region outer contour including the starting region outer contour, two respective adjacent candidate regions form an inner candidate region and an outer candidate region with respect to one another, and the candidate region outer contour of each outer candidate region includes the candidate region outer contour of the associated inner candidate region; and
   selecting a candidate region closest to the lesion from the quantity of candidate regions, wherein the candidate regions are connected regions of pixels of one respective quantization step.

2. A method according to claim 1, wherein the image region is prepared before the determination of the starting region by low-pass filtering of associated digital image data.

3. A method according to claim 1, wherein before the determination of the starting region, the image region is prepared by a quantization step reduction of associated digital image data.

4. A method according to claim 1, wherein the starting region is a connected region of pixels of one quantization step.

5. A method according to claim 1, wherein the starting region exceeds a predefined minimum size.

6. A method according to claim 1, wherein a spacing of the starting region from a center point of the image region falls below a predefined maximum spacing.

7. A method according to claim 1, wherein the starting region has the brightest quantization step.

8. A method according to claim 1, wherein the candidate regions, proceeding from the starting region, have monotonically decreasing quantization steps.

9. A method according to claim 1, wherein a barrier predefined by a user interface limits at least one of the candidate regions.

10. A method according to claim 1, wherein the candidate regions are determined by a level set method.

11. A method according to claim 10, wherein using image information from the image region and properties of the starting region outer contour a speed function is defined, which describes a speed with which the points of the starting region outer contour move orthogonally with respect thereto.

12. A method according to claim 10, wherein to each instant within the level set method a size of a current region at this instant is allocated, so a size function is produced, a region being allocated to the quantity of candidate regions if a first derivation of the size function has a local minimum.

13. A method according to claim 1, wherein the selection of the candidate region closest to the lesion takes place by means of at least one predefined selection criterion.

14. A method according to claim 1, wherein the selection of the candidate region closest to the lesion takes place by means of a user interface.

15. A device for the segmentation of a lesion, comprising:
   an input for providing an image region selected from a digital image with a recorded lesion;
   an initialization unit for determining a starting region for the lesion in the image region, the starting region having a starting region outer contour;
   a candidate unit for determining a quantity of candidate regions for the lesion, wherein the candidate regions are determinable in such a way that each candidate region has a candidate region outer contour including the starting region outer contour, two respective adjacent candidate regions form an inner candidate region and an outer candidate region with respect to one another, and the candidate region outer contour of each outer candidate region includes the candidate region outer contour of the associated inner candidate region; and
   a selection unit for selecting a candidate region closest to the lesion from the quantity of candidate regions, wherein the candidate regions are connected regions of pixels of one respective quantization step.

16. A device according to claim 15, wherein a correction unit connected to a user interface is provided to select the candidate region closest to the lesion.

17. A device according to claim 15, wherein a barrier unit connected to a user interface is provided to define barriers for the candidate regions.

18. A device according to claim 15, wherein a preparation unit is provided to prepare the image region.

19. A method for the segmentation of a lesion, comprising the steps:
   providing an image region selected from a digital image with a recorded lesion;
   determining a starting region for the lesion in the image region, wherein the starting region has a starting region outer contour;
   determining a quantity of candidate regions for the lesion in such a way that each candidate region has a candidate region outer contour including the starting region outer contour, two respective adjacent candidate regions form an inner candidate region and an outer candidate region with respect to one another, and the candidate region outer contour of each outer candidate region includes the candidate region outer contour of the associated inner candidate region; and
   selecting a candidate region closest to the lesion from the quantity of candidate regions, said candidate regions being determined by a level set method, wherein to each instant within the level set method a size of a current region at this instant is allocated, so a size function is produced, a region being allocated to the quantity of candidate regions if a first derivation of the size function has a local minimum.

20. A device for the segmentation of a lesion, comprising:
   an input for providing an image region selected from a digital image with a recorded lesion;
   an initialization unit for determining a starting region for the lesion in the image region, the starting region having a starting region outer contour;
   a candidate unit for determining a quantity of candidate regions for the lesion, wherein the candidate regions are determinable in such a way that each candidate region has a candidate region outer contour including the starting region outer contour, two respective adjacent candidate regions form an inner candidate region and an outer candidate region with respect to one another, and the candidate region outer contour of each outer candidate region includes the candidate region outer contour of the associated inner candidate region; and a selection unit for selecting a candidate region closest to the lesion from the quantity of candidate regions, said candidate regions being determined by a level set method, wherein to each instant within the level set method a size of a current region at this instant is allocated, so a size function is produced, a region being allocated to the quantity of candidate regions if a first derivation of the size function has a local minimum.

* * * * *

UNITED STATES PATENT AND TRADEMARK OFFICE
CERTIFICATE OF CORRECTION

| | | |
|---|---|---|
| PATENT NO. | : 8,600,141 B2 | Page 1 of 1 |
| APPLICATION NO. | : 12/935684 | |
| DATED | : December 3, 2013 | |
| INVENTOR(S) | : Matthias Elter | |

It is certified that error appears in the above-identified patent and that said Letters Patent is hereby corrected as shown below:

Title page, item [73]

Assignee Data should read as follows: Fraunhofer-Gesellschaft zur Förderung der angewandten Forschung e.V.

Signed and Sealed this
Eighteenth Day of February, 2014

Michelle K. Lee
*Deputy Director of the United States Patent and Trademark Office*